United States Patent [19]

Brady, III et al.

[11] Patent Number: 5,093,415
[45] Date of Patent: Mar. 3, 1992

[54] PROCESS FOR PRODUCING STEREOREGULAR POLYMERS HAVING A NARROW MOLECULAR WEIGHT DISTRIBUTION

[75] Inventors: Robert C. Brady, III, Morristown; Francis G. Stakem, Raritan, both of N.J.; Han T. Liu, Cross Lanes, W. Va.; Allen Noshay, East Brunswick, N.J.

[73] Assignee: Union Carbide Chemicals & Plastics Technology Corporation, Danbury, Conn.

[21] Appl. No.: 51,853

[22] Filed: May 19, 1987

[51] Int. Cl.$^5$ ............................ C08F 2/34; C08F 10/06
[52] U.S. Cl. ...................................... 525/53; 526/124; 526/351; 526/901
[58] Field of Search .................... 526/124, 128; 525/53

[56] References Cited

U.S. PATENT DOCUMENTS 4,535,068 8/1985 Job ........................................ 526/125
4,611,038 9/1986 Brun et al. ............................ 526/901

FOREIGN PATENT DOCUMENTS 2111066 6/1983 United Kingdom .
2143834 2/1985 United Kingdom .

Primary Examiner—Edward J. Smith
Attorney, Agent, or Firm—John S. Piscitello

[57] ABSTRACT

Stereoregular polymers having a molecular weight distribution of less than 5.0 and an isotactic index in excess of 96 percent are produced by polymerizing an alpha-olefin having 3 to 8 carbon atoms in a low pressure gas phase fluid bed process at a temperature in excess of 80° C. employing a heat stable catalyst system comprising (a) a solid catalyst component containing magnesium, titanium, halide and a polycarboxylic acid ester containing two coplanar ester groups attached to adjacent carbon atoms, as inside electron donor, (b) an organoaluminum cocatalyst, and (c) a silicon compound containing a silicon-oxygen-carbon linkage, as outside electron donor.

9 Claims, No Drawings

PROCESS FOR PRODUCING STEREOREGULAR POLYMERS HAVING A NARROW MOLECULAR WEIGHT DISTRIBUTION

FIELD OF THE INVENTION

This invention relates to a process for producing stereoregular polymers having a narrow molecular weight distribution in high yields at high production rates.

BACKGROUND OF THE INVENTION

Olefin polymerization catalysts prepared by combining an organoaluminum component with a solid second component containing magnesium, titanium and halogen are well known in the art. It is also well known that the activity of such catalysts, as well as their ability to produce stereoregular polymers, can be enhanced by incorporating an electron donor (Lewis base) into the solid second component. The addition of an electron donor to the catalyst system independently of the solid second component is also known to enhance the stereospecific character of these catalysts. When the electron donor is added separately from the solid second component, it may be complexed in whole or in part with the organoaluminum component. When an electron donor is added separately from the second catalyst component, it is sometimes referred to as a selectivity control agent or an outside electron donor. The electron donor incorporated into the second catalyst component is referred to as an inside electron donor.

More specifically, U.S. Pat. No. 4,414,132 discloses an olefin polymerization catalyst for the production of polymers of high isotacticity comprising (1) an organoaluminum compound, (2) a selectivity control agent, and (3) a solid composition obtained by halogenating a magnesium compound of the formula MgR'R", wherein R' is an alkoxide or aryloxide group and R" is an alkoxide or aryloxide group or halogen, with a halogenated tetravalent titanium compound in the presence of a halohydrocarbon and an electron donor, and subsequentlycontacting the halogenated product with additional tetravalent titanium compound. According to the reference, the organoaluminum compound and the selectivity control agent may be used separately, or partially or completely complexed with each other. The solid component obtained by treating the magnesium compound with the halogenated titanium compound is referred to in the reference as the "procatalyst", and the organoaluminum compound, whether used separately or partially or completely complexed with the selectivity control agent, is referred to as the "cocatalyst". An electron donor is employed as the "selectivity control agent", and this term is applied to such electron donor whether it is used separately or partially or completely complexed with the organoaluminum compound.

U.S. Pat. No. 4,535,068 discloses that the productivity of the olefin polymerization catalyst prepared in accordance with U.S. Pat. No. 4,414,132 can be improved as much as 20 percent if the product obtained by halogenating the magnesium compound with the halogenated tetravalent titanium compound in the preparation of the "procatalyst" of that reference is treated with a carboxylic acid halide prior to or at the same time that it is treated with additional tetravalent titanium compound. However, as in the case of the stereospecific catalyst of U.S. Pat. No. 4,414,132, as the concentration of selectivity control agent in the catalyst is increased in an attempt to increase the amount of stereoregular polymer produced, the catalyst undergoes increasing decline in activity. This decline in activity is accentuated as the temperature of polymerization is increased. Thus, this catalyst, like the catalyst of U.S. Pat. No. 4,414,132, has exhibited less than desirable activity in the production of polymers having an isotactic index in excess of 96 percent.

Therefore, in order to maintain satisfactorylevels of catalyst activity using the catalyst systems of U.S. Pat. Nos. 4,414,132 and 4,535,068, it is necessary to restrict the ratio of selectivity control agent (outside electron donor) to organoaluminum cocatalyst employed, as well as the temperature of polymerization. Generally, ratios no higher than 0.3:1 are employed together with temperatures no higher than 70° C. The polymers prepared under such conditions have been found to have a relatively broad molecular weight distribution($M_w/M_n$), i.e., in excess of about 5.0.

However, in order to produce polymers having a narrow molecular weight distribution, i.e., below 5.0, it is necessary to employ polymerization temperatures in excess of 80° C. Polymers having a narrow molecular weight distribution and a high degree of stereoregularity are useful in applications such as fiber spinning and injection molding. To date, such polymers have not been produced directly in the polymerization reactor, but rather by post-polymerization controlled rheology techniques involving the use of peroxides to effect free radical degradation of the polymers. In order to be most feasible economically, however, any process for producing polymers of this type must be capable of producing them directly in the polymerization reactor without the necessity of postpolymerization processing by way of extraction to remove residual catalyst and/or atactic polymer produced, or rheology altering techniques.

European patent specification 0 045 977 B1 discloses a catalyst for the polymerization of alpha-olefins which comprises the reaction product of a) an alkylaluminum compound, b) a silicon compound, and c) a solid catalyst component comprising a magnesium dihalide, as essential support, and supported on said dihalide, a titanium halide or a titanium haloalcoholate and an electron donor selected from certain esters.

*Die Angewandte Makromolekulare Chemie,* 120 (1984) 73-90 (Nr. 1935), "High Yield Catalysts in Olefin Polymerization", Paolo Galli, Pier Camillo Barbe and Luciano Noristi further teaches that both yield and isotacticity of polymers prepared by means of certain stereospecific catalysts containing magnesium dichloride and titanium tetrachloride may be improved by increasing the temperature of polymerization from 50° C. to 80° C. (FIGS. 13 and 14). However, the precise nature of the catalyst, and how it is prepared, is not described in the reference, nor is the ratio of outside electron donor (or Lewis base) to alkylaluminum cocatalyst which must be employed with such catalyst in order to obtain polymers having high isotacticity in high yield U.K. patent application 2 1110066 A teaches that catalysts similar to those of European patent specification 0 045 977 B1 can be employed to polymerize propylene at temperatures of 80° C.-90° C. using ratios of outside electron donor (selectivity control agent) to alkylaluminum compound of 0.05:1 to 0.1:1 (see examples 7-14) to produce high yields of polymer having a high degree of stereoregularity. The behavior of these catalysts contrasts sharply with the behavior of the catalyst systems of U.S. Pat. Nos. 4,414,132 and 4,535,068 which undergo a decline in activity as the temperature of polymerization is increased and a decline in stereospecificity as the ratio of outside electron donor to alkylaluminum cocatalyst is decreased.

Thus, it is clear from the prior art that the ratio of outside electron donor (selectivity control agent) to alkylaluminum cocatalyst present in a given catalyst system, and the polymerization temperature at which the catalyst system is employed, significantly affect both catalyst activity and the isotacticity of the polymers produced. The effect of these factors on catalyst activity and polymer isotacticity vary widely from system to system, and appear to produce divergent and contradictory results depending upon the nature of the catalyst employed and the manner in which it is prepared. The dependence of a particular catalyst system upon factors of this nature restricts the versatility of the system and limits the conditions under which it may be employed, and thus the ability of the system to produce polymers having a variety of properties at acceptable levels of catalyst activity. For example, to date no process has been proposed which is capable of producing polymers having a narrow molecular weight distribution as well as a high level of isotacticity at satisfactory levels of catalyst activity in a low pressure gas phase fluid bed process.

SUMMARY OF THE INVENTION

In accordance with the present invention, it has now been discovered that polymers having a molecular weight distribution ($M_w/M_n$) of less than 5.0 and an isotactic index in excess of 96 percent can be prepared in high yield at high production rates by polymerizing an alpha-olefin having 3 to 8 carbon atoms in a low pressure gas phase fluid bed process at a temperature in excess of 80° C. employing a heat stable catalyst system comprising (a) a solid catalyst component containing magnesium, titanium, halide and a polycarboxylic acid ester containing two coplanar ester groups attached to adjacent carbon atoms, as inside electron donor, (b) an organoaluminum cocatalyst, and (c) a silicon compound containing a silicon-oxygen-carbon linkage, as selectivity control agent or outside electron donor.

More specifically, the catalyst which has been found suitable for producing the desired polymers at high levels of activity comprises:

(a) a solid composition obtained by halogenating a magnesium compound of the formula MgR'R", wherein R' is an alkoxide or aryloxide group and R" is an alkoxide or aryloxide group or halogen, with a halogenated tetravalent titanium compound in the presence of a halohydrocarbon and a polycarboxylic acid ester containing two coplanar ester groups attached to adjacent carbon atoms; treating the halogenated product with additional halogenated tetravalent titanium compound; washing the treated product to remove unreacted titanium compounds; and recovering the solid product, (b) an organoaluminum compound, and (c) a silicon compound containing a silicon-oxygen-carbon linkage, said catalyst containing an atomic ratio of aluminum in the organoaluminum compound to silicon in the silicon compound of from 0.5:1 to 100:1, and an atomic ratio of aluminum in the organoaluminum compound to titanium in the solid composition of from 5:1 to 300:1.

Such catalyst has been found capable of polymerizing alpha-olefins in gas phase at low pressures for extended periods of time at temperatures sufficiently elevated to produce polymers having a narrow molecular weight distribution as well as a high level of isotacticity without substantial loss of activity. The ability of the catalyst to maintain a high level of activity for extended periods of time allows it to be used in processes where prolonged polymerization times are required along with a high level of polymer productivity, such as in multistage continuous processes for the production of high impact copolymers.

The polymers produced by the process of the present invention have a molecular weight distribution ($M_w/M_n$) of less than 5.0 and an isotactic index in excess of 96 percent. Usually, the polymers have a molecular weight distribution ($M_w/M_n$) of from 2.0 to 5.0, preferably of from 3.0 to 4.5, and an isotactic index of from 96 percent to 99 percent, preferably of from 97 percent to 99 percent.

DETAILED DESCRIPTION OF THE INVENTION

The solid catalyst component of the catalyst system employed in the process of the invention is prepared by halogenating a magnesium compound of the formula MgR'R", wherein R' is an alkoxide or aryloxide group and R" is an alkoxide or aryloxide group or halogen, with a halogenated tetravalent titanium compound in the presence of a halohydrocarbon and a polycarboxylic acid ester containing two coplanar ester groups attached to adjacent carbon atoms.

The magnesium compound employed in the preparation of the solid catalyst component is preferably a magnesium dialkoxide or a magnesium diaryloxide, most preferably a magnesium dialkoxide. Magnesium compounds containing one alkoxide and one aryloxide group can also be employed, as well as magnesium compounds containing a halogen in addition to one alkoxide or aryloxide group. The alkoxide groups, when present, most suitably contain from 1 to 8 carbon atoms, preferably from 2 to 6 carbon atoms. The aryloxide groups, when present, most suitably contain from 6 to 10 carbon atoms. When halogen is present, it is preferably present as chlorine.

Among the magnesium dialkoxides and diaryloxides which can be employed are magnesium diethoxide, magnesium diisopropoxide, magnesium di-n-butoxide, magnesium diphenoxide, magnesium dinaphthoxide and ethoxy magnesium isobutoxide. Magnesium diethoxide is particularly preferred.

Illustrative of magnesium compounds containing one alkoxide and one aryloxide group which can be employed are ethoxy magnesium phenoxide and naphthoxy magnesium isoamyloxide.

Suitable alkoxy and aryloxy magnesium halides include ethoxy magnesium bromide, isobutoxy magnesium chloride, phenoxy magnesium iodide, cumyloxy magnesium bromide and naphthoxy magnesium chloride.

The halogenated tetravalent titanium compound employed to halogenate the magnesium compound must contain at least two halogen atoms, and preferably contains four halogen atoms. Most preferably these halogen atoms are chlorine atoms. However, titanium compounds containing up to two alkoxy and/or aryloxy groups can also be employed. The alkoxy groups, when present, most suitably contain from 1 to 8 carbon atoms, preferably from 2 to 6 carbon atoms. The aryloxy groups, when present, most suitably contain from 6 to 12 carbon atoms, preferably from 6 to 10 carbon atoms. Examples of suitable alkoxy- and aryloxy-titanium halides include diethoxy titanium dibromide, isopropoxy titanium triiodide, dihexoxy titanium dichloride, and phenoxy titanium trichloride.

Halogenation of the magnesium compound with the halogenated tetravalent titanium compound, as noted, is conducted in the presence of a halohydrocarbon and a polycarboxylic acid ester concontaining two coplanar ester groups attached to adjacent carbon atoms. If desired, an inert hydrocarbon diluent or solvent may also be present, although this is not necessary.

The halohydrocarbon employed may be aromatic, aliphatic, or alicyclic.

Aromatic halohydrocarbons are preferred, particularly those containing from 6 to 12 carbon atoms, and especially those containing from 6 to 10 carbon atoms. Preferably such halohydrocarbons contain 1 or 2 halogen atoms, although more may be present if desired. Most preferably the halogen is present as chlorine. Suitable aromatic halohydrocarbons include chlorobenzene, bromobenzene, dichlorobenzene, dichlorodibromobenzene, chlorotoluene, dichlorotoluene, ohloronaphthalene, and the like. Chlorobenzene and dichlorobenzene are preferred, especially the former.

The aliphatic halohydrocarbons which can be employed suitably contain from 1 to 12 carbon atoms. Preferably such halohydrocarbons contain from 1 to 9 carbon atoms and at least 2 halogen atoms. Most preferably the halogen is present as chlorine. Suitable aliphatic halohydrocarbons include dibromomethane, trichloromethane, 1,2-dichloroethane, trichloroethane, dichlorofluoroethane, hexachloroethane, trichloropropane, chlorobutane, dichlorobutane, chloropentane, trichlorofluorooctane, tetrachloroisooctane, dibromodifluorodecane, and the like. Carbon tetrachloride and trichloroethane are preferred.

The alicyclic halohydrocarbons which can be employed suitably contain from 3 to 12 carbon atoms. Preferably such halohydrocarbons contain from 3 to 9 carbon atoms and at least 2 halogen atoms. Most preferably the halogen is present as chlorine. Suitable alicyclic halohydrocarbons include dibromocyclobutane and trichlorocyclohexane.

The polycarboxylic acid ester employed in the preparation of the solid catalyst component serves as an inside electron donor and is present in the final product as well as during its' preparation. Suitable esters are characterized by a molecularly rigid structure wherein two ester groups are attached to adjacent carbon atoms of the molecule and lie in a single plane. Such esters include:
  (a) polycarboxylic acid esters containing two ester groups which are attached to ortho carbon atoms of a monocyclic or polycyclic aromatic ring, each of said ester groups being further linked to a branched or unbranched chain hydrocarbon radical,
  (b) polycarboxylic acid esters containing two ester groups which are attached to vicinal carbon atoms of a non-aromatic monocyclic or polycyclic ring and which lie in a syn configuration with respect to each other, each of said ester groups being further linked to a branched or unbranched chain hydrocarbon radical, and
  (c) polycarboxylic acid esters containing two ester groups which are attached to vicinal double bonded carbon atoms of an unsaturated aliphatic compound and which lie in a syn configuration with respect to each other, each of said ester groups being further linked to a branched or unbranched chain hydrocarbon radical.

The polycarboxylic acid esters employed in the preparation of the solid catalyst component are derived from a suitable polycarboxylic acid and a monohydric alcohol having a linear hydrocarbon moiety which may be branched or unbranched. Suitable polycarboxylic acids include:
  (a) monocyclic or polycyclic aromatic compounds containing two carboxyl group which are attached to ortho carbon atoms of the ring structure,
  (b) monocyclic or polycyclic non-aromatic compounds containing two carboxyl groups which are attached to vicinal carbon atoms of the ring structure and which lie in a syn configuration with respect to each other, or
  (c) unsaturated aliphatic compounds containing two carboxyl groups which are attached to vicinal double bonded carbon atoms and which lie in a syn configuration with respect to each other.

Among the polycarboxylic acid esters which may be employed as inside electron donors may be mentioned dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl-1,2-fluorenedicarboxylate, diisopropyl-1,2-ferrocenedicarboxylate, cis-diisobutyl-cyclobutane-1,2-dicarboxylate, endo-diisobutyl-5-norbornene-2,3-dicarboxylate and endo-diisobutyl-bicyclo[2.2.2]oct-5-ene-2,3-dicarboxylate, diisobutyl maleate, diisoamyl citraconate, and the like. Diisobutyl phthalate is most preferred.

The alcohols employed to produce the polycarboxylic acid esters employed as inside electron donors in the solid catalyst component contain from 1 to 12 carbon atoms, usually 3 to 12 carbon atoms, and preferably 4 to 12 carbon atoms. If desired, the alcohol employed may be substituted with one or more substituents which are inert under the reaction conditions employed during esterification, as well as during preparation of the solid catalyst component and polymerization with such catalyst component. Suitable alcohols include ethyl alcohol, n-propyl alcohol, isopropyl alcohol, isobutyl alcohol, tert-butyl alcohol, isoamyl alcohol, tert-amyl alcohol, 2-ethylhexyl alcohol, 2-ethyldecyl alcohol, and the like. Isobutyl alcohol is most preferred.

The aromatic compounds employed to produce the polycarboxylic acid esters employed as inside electron donors in the solid catalyst component contain two carboxyl groups which are attached to ortho carbon atoms of the ring structure. These compounds contain at least 8 carbon atoms, usually 8 to 20 carbon atoms, and preferably 8 to 16 carbon atoms. Although preferably monocyclic, they may contain more than one aromatic ring. If desired, they may be substituted with one or more substituents which are inert under the reaction conditions employed during esterification, as well as during preparation of the solid catalyst component and polymerization with such catalyst component. Suitable aromatic compounds include phthalic acid (1,2-benzenedicarboxylic acid), 2,3-naphthalenedicarboxylic acid, 1,2-anthracenedicarboxylic acid, 1,2-fluorenedicarboxylic acid, 3,4-fluorenedicarboxylic acid, 1,2-ferrocenedicarboxylic acid, and the like.

The non aromatic cyclic compounds employed to produce the polycarboxylic acid esters employed as inside electron donors in the solid catalyst component contain two carboxyl groups which are attached to vicinal carbon atoms of the ring structure and which lie in a syn configuration with respect to each other. Both monocyclic and polycyclic compounds are suitable. These compounds contain at least 6 carbon atoms, usually 6 to 20 carbon atoms, and preferably 6 to 10 carbon atoms. If desired, they may be substituted with one or more substituents which are inert under the reaction conditions employed during esterification, as well as during preparation of the solid catalyst component and polymerization with said catalyst component. Suitable cyclic compounds include ciscyclobutane-1,2-dicarboxylic acid, endo-5-norbornene-2,3-dicarboxylic acid, endo dicyclopentadiene-2,3-dicarboxylic acid, endo-bicyclo[2.2.2]oct-5-ene-2,3-dicarboxylic acid, endobicyclo[3.2.1]oct-2-ene-6,7-dicarboxylic acid, and the like.

The unsaturated aliphatic compounds employed to produce the polycarboxylic acid esters employed as inside electron donors in the solid catalyst component contain two carboxyl groups which are attached to vicinal double bonded carbon atoms and which lie in a syn configuration with respect to each other. These compounds contain at least 6 carbon atoms, usually 6 to 20 carbon atoms, and preferably 6 to 10 carbon atoms. If desired, they may be substituted with one or more substituents which are inert under the reaction conditions employed during esterification, as well as during preparation of the solid catalyst component and polymerization with said catalyst component. Suitable compounds include maleic acid, citraconic acid, and the like.

Halogenation of the magnesium compound with the halogenated tetravalent titanium compound is effected employing an excess of the titanium compound. At least 2 moles of the titanium compound should ordinarily be employed per mole of the magnesium compound. Preferably from 4 moles to 100 moles of the titanium compound are employed per mole of the magnesium compound, and most preferably from 4 moles to 20 moles of the titanium compound are employed per mole of the magnesium compound.

Halogenation of the magnesium compound with the halogenated tetravalent titanium compound, as noted, is conducted in the presence of a halohydrocarbon and a polycarboxylic acid ester containing two coplanar ester groups attached to adjacent carbon atoms. The halohydrocarbon is employed in an amount sufficient to dissolve the titanium compound and the ester, and to adequately disperse the solid, insoluble magnesium compound. Usually the dispersion contains from 0.005 to 2.0 moles of the solid magnesium compound per mole of halohydrocarbon, preferably from 0.01 to 1.0 mole of the solid magnesium compound per mole of the halo hydrocarbon. The polycarboxylic acid ester, which, as previously noted, serves as an inside electron donor, is employed in an amount sufficient to provide a molar ratio of said compound to the titanium compound of from 0.0005:1 to 2.0:1, preferably of from 0.001:1 to 0.1:1.

Halogenation of the magnesium compound with the halogenated tetravalent titanium compound can be effected at a temperature of from 60° C. to 150° C., preferably from 70° C. to 120° C. Usually the reaction is allowed to proceed over a period of 0.1 to 6 hours, preferably between 0.5 to 3.5 hours. For convenience, halogenation is usually effected at atmospheric pressure, although higher and lower pressures can be employed if desired. The halogenated product, like the starting magnesium compound, is a solid material which can be isolated from the liquid reaction medium by filtration, decantation or the suitable method.

After the solid halogenated product has been separated from the liquid reaction medium, it is treated one or more times with additional halogenated tetravalent titanium compound in order to remove residual alkoxy and/or aryloxy groups and maximize catalyst activity. Preferably, the halogenated product is treated at least twice with separate portions of the halogenated tetravalent titanium compound. As in the initial halogenation, at least 2 moles of the titanium compound should ordinarily be employed per mole of the magnesium compound, and preferably from 4 moles to 100 moles of the titanium compound are employed per mole of the magnesium compound, most preferably from 4 moles to 20 moles of the titanium compound per mole of the magnesium compound.

Generally, the reaction conditions employed to treat the solid halogenated product with the titanium compound are the same as those employed during the initial halogenation of the magnesium compound, although it is not necessary that the polycarboxylic acid ester be present during this treatment. The halohydrocarbon is usually employed, however, to dissolve the titanium compound and disperse the solid halogenated product. Usually the dispersion contains from 0.005 to 2.0 gram atoms of magnesium per mole of halohydrocarbon, preferably from 0.01 to 1.0 gram atoms of magnesium per mole of halohydrocarbon.

As stated above, the halogenated product is preferably treated at least twice with separate portions of the halogenated tetravalent titanium compound. In order to assist in the removal of residual alkoxy and/or aryloxy moiety from the halogenated product, the second such treatment is preferably effected in the presence of a polycarboxylic acid halide containing two coplanar acid halide groups attached to adjacent carbon atoms. While it is possible to employ the acid halide separately, for convenience it is preferable to employ it together with the titanium compound dissolved in the halohydrocarbon. Should circumstances warrant such procedure, however, the halogenated product may be treated with the acid halide before or after it is treated with the titanium compound for the second time. In any event, from 5 mmol to 200 mmol of the acid halide are generally employed per gram atom of magnesium of the halogenated product.

The polycarboxylic acid halides employed can be prepared by reacting a hydrogen halide with any of the polycarboxylic acids employed to prepare the polycarboxylic acid esters employed as inside electron donors in the solid catalyst component. Preferably, the halide moiety of such acid halides is chloride or bromide, most preferably chloride, and the polycarboxylic acid moiety corresponds to the polycarboxylic acid moiety of the inside electron donor employed in the preparation of the solid catalyst component. Suitable acid halides include phthaloyl dichloride, 2,3-naphthalenedicarboxylic acid dichloride, endo-5-norbornene-2,3-dicarboxylic acid dichloride, maleic acid dichloride, citraconic acid dichloride, and the like.

After the solid halogenated product has been treated one or more times with additional halogenated tetravalent titanium compound, it is separated from the liquid reaction medium, washed with an inert hydrocarbon to remove unreacted titanium compounds, and dried. The final washed product suitably has a titanium content of from 0.5 percent by weight to 6.0 percent by weight, preferably from 2.0 percent by weight to 4.0 percent by weight. The atomic ratio of titanium to magnesium in the final product is suitably between 0.01:1 and 0.2:1, preferably between 0.02:1 and 0.1:1. The polycarboxylic acid ester is present in a ratio of ester to magnesium of from 0.005:1 to 10.0:1, preferably from 0.02:1 to 2.0:1.

The organoaluminum compound employed as cocatalyst in the catalyst system employed in the process of the invention may be chosen from any of the known activators of olefin polymerization catalyst systems employing a titanium halide. Trialkylaluminum compounds, however, are preferred, particularly those wherein each of the alkyl groups contain from 1 to 6 carbon atoms. Suitable organoaluminum cocatalysts include compounds having the formula $$Al(R''')_d X_e H_f$$

wherein:

X is F, Cl, Br, I or OR'''',

R''' and R'''' are saturated hydrocarbon radicals containing from 1 to 14 carbon atoms, which radicals may be the same or different, and, if desired, substituted with any substituent which is inert under the reaction conditions employed during polymerization, d is 1 to 3, e is 0 to 2, f is 0 or 1, and $d+e+f=3$.

Such activator compounds can be employed individually or in combination thereof and include compounds such as $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(i-C_4H_9)_3$, $Al(i-C_4H_9)_2H$, $Al(C_6H_{13})_3$ and $Al(C_8H_{17})_3$).

The silicon compounds employed as selectivity control agent or outside electron donor in the catalyst system employed in the process of the invention contains at least one silicon-oxygen-carbon linkage. Suitable silicon compounds include compounds having the formula $$R''''''_m Si Y_n X_p$$

wherein:

R'''''' is a hydrocarbon radical containing from 1 to 20 carbon atoms,

Y is —OR'''''' or —OCOR'''''' wherein

R'''''' is a hydrocarbon radical containing from 1 to 20 carbon atoms,

X is hydrogen or halogen, m is an integer having a value of from 0 to 3, n is an integer having a value of from 1 to 4, p is an integer having a value of from 0 to 1, and m+n+p is equal to 4.

Each of R'''''' and R'''''' may be the same or different, and, if desired, substituted with any substituent which is inert under the reaction conditions employed during polymerization. Preferably, R'''''' and R'''''' contain from 1 to 10 carbon atoms when they are aliphatic or cycloaliphatic, and from 6 to 10 carbon atoms when they are aromatic.

Silicon compounds in which two or more silicon atoms are linked to each other by an oxygen atom may also be employed, provided the requisite silicon-oxygen-carbon linkage is also present.

The preparation of polymers having a molecular weight distribution ($M_w/M_n$) of less than 5.0 and an isotactic index in excess of 96 percent is effected, according to the present invention, in a fluidized bed polymerization reactor, by continuously contacting an alpha-olefin having 3 to 8 carbon atoms with the three components of the catalyst system, i.e., the solid catalyst component, cocatalyst and selectivity control agent. In accordance with the process, discrete portions of the catalyst components are continually fed to the reactor in catalytically effective amounts together with the alpha-olefin while the polymer product is continually removed during the continuing process. Fluid bed reactors suitable for continuously polymerizing alpha-olefins have been previously described and are well known in the art. Fluid bed reactors useful for this purpose are described, e.g., in U.S. Pat. Nos. 4,302,565, 4,302,566 and 4,303,771, the disclosures of which are incorporated herein by reference.

The solid catalyst component, cocatalyst, and selectivity control agent can be introduced into the polymerization reactor through separate feed lines or, if desired, two or all of the components may be partially or completely mixed with each other before they are introduced into the reactor. In either event, the cocatalyst and the selectivity control agent are employed in such amounts as to provide an atomic ratio of aluminum in the cocatalyst to silicon in the selectivity control agent of from 0.5:1 to 100:1, preferably from 2:1 to 50:1, and the cocatalyst and the solid catalyst component are employed in such amounts as to provide an atomic ratio of aluminum in the cocatalyst to titanium in the solid catalyst component of from 5:1 to 300:1, preferably from 10:1 to 200:1.

Both the cocatalyst and the selectivity control agent may be introduced into the reactor dissolved in an inert liquid solvent, i.e., a solvent which is nonreactive with all the components of the catalyst composition and all other active components of the reaction system. Hydrocarbons such as isopentane, hexane, heptane, toluene, xylene, naphtha and mineral oil are preferred for this purpose. Generally, such solutions contain from 1 weight percent to 75 weight percent of the cocatalyst and/or the selectivity control agent. If desired, less concentrated or more concentrated solutions can be employed, or, alternatively, the cocatalyst and the selectivity control agent can be added in the absence of solvent, or, if desired, suspended in a stream of liquefied monomer. When a solvent is employed, however, the amount of solvent introduced into the reactor should be carefully controlled so as to avoid the use of excessive quantities of liquid which would interfere with the operation of the fluidized bed.

The solvents employed to dissolve the co-catalyst and the selectivity control agent may also be employed to introduce the solid catalyst component into the reactor. While the solid catalyst component may also be introduced into the reactor in the absence of solvent or suspended in liquefied monomer, such solvents are preferably employed to disperse the solid catalyst component and facilitate its flow into the reactor. Such dispersions generally contain from 1 weight percent to 75 weight percent of the solid component.

The alpha-olefins useful in preparing polymers having a molecular weight distribution ($M_w/M_n$) of less than 5.0 and an isotactic index in excess of 96 percent contain from 3 to 8 carbon atoms per molecule. These alpha-olefins should not contain any branching on any of their carbon atoms closer than two carbon atoms removed from the double bond. Suitable alpha-olefins include propylene, butene-1, pentene-1, hexene-1, 4-methylpentene-1, heptene-1 and octene-1.

The alpha-olefins useful in the process of the present invention may, if desired, also be employed to produce copolymers by copolymerizing them with up to 20 mole percent of ethylene and/or another alpha-olefin containing 3 to 8 carbon atoms per molecule. Such copolymerizations are particularly useful in processes which employ sequential polymerization cycles to produce polymers having improved impact properties, e.g., by homopolymerizing an alpha-olefin in one reactor and subsequently copolymerizing it in a second reactor in the presence of the product of the first reactor. This technique has been employed to produce high impact polypropylene by a multi-stage process wherein propylene is homopolymerized in one reaction zone and then copolymerized with ethylene in a separate reaction zone, arranged in sequence with the first reaction zone, in the presence of the homopolymer produced in the first reaction zone. When multiple reactors are employed in this manner, it is sometimes necessary to add additional amounts of cocatalyst to the second reactor in order to maintain an active catalyst. Additional amounts of the solid catalyst component and selectivity control agent are generally not required.

If desired, the gaseous reaction mixture may be diluted with an inert gas, i.e., a gas which is nonreactive with all the components of the catalyst composition and all other active components of the reaction system. The gaseous reaction mixture should, of course, be substantially free of catalyst poisons, such as moisture, oxygen, carbon monoxide, carbon dioxide, acetylene, and the like.

Hydrogen may also be added to the reaction mixture as a chain transfer agent to regulate molecular weight. Generally, hydrogen is added to the reaction mixture in an amount sufficient to produce a mol ratio of hydrogen to alpha-olefin of from about 0.00001:1 to about 0.5:1. In addition to hydrogen, other chain transfer agents may be employed to regulate the molecular weight of the polymers.

In order to maintain a viable fluidized bed, the superficial gas velocity of the gaseous reactor mixture through the bed must exceed the minimum flow required for fluidization and preferably is at least 0.06 meter per second above minimum flow. Ordinarily the superficial gas velocity does not exceed 1.5 meters per second, and most usually no more than 0.75 meters per second is sufficient.

Pressures of up to about 7000 kPa can be employed in the process, although pressures of from about 70 kPa to about 3500 kPa are preferred. The partial pressure of the alpha-olefin employed is usually maintained between about 56 kPa to about 2800 kPa.

In order to produce polymers having a molecular weight distribution ($M_w/M_n$) of less than 5.0 and an isotactic index in excess of 96 percent, it is necessary to employ polymerization temperatures of at least 80° C. The higher the temperature employed, the narrower the molecular weight distribution of the polymers produced. For this reason, temperatures of at least 100° C. are preferred, as such temperatures result in polymers having a molecular weight distribution of less than 4.5. However, temperatures in excess of 160° C. should be avoided in order to prevent agglomeration of the polymer product.

The polymers produced in accordance with the process of the present invention have a melt flow rate of from 0.1 g/10 minutes to about 1000 g/10 minutes, preferably of from about 1 g/10 minutes to about 50 g/10 minutes. The melt flow of a polymer varies inversely with its molecular weight.

The polymers produced in accordance with the process of the present invention are granular materials having an average particle size of from about 0.01 to about 0.20 centimeters, usually of from about 0.02 to about 0.13 centimeters, in diameter. The particle size is important for the purpose of readily fluidizing the polymer particles in the fluid bed reactor.

The polymers produced in accordance with the process of the present invention have a bulk density of from about 200 kilograms per cubic meter to about 513 kilograms per cubic meter.

The following Examples are designed to illustrate the process of the present invention and are not intended as a limitation upon the scope thereof.

The properties of the polymers produced in the Examples was determined by the following test methods:

Melt Flow Rate (MFR)

ASTM D-1238, Condition L. Measured at 230° C. with a 2160 g load and reported as grams per 10 minutes.

Productivity

A weighed sample of the polymer product is ashed, and the titanium content of the ash is determined spectrophotometrically. Productivity is reported as kilograms of polymer produced per gram of titanium in the polymer.

When a batch polymerization is employed, productivity is determined from the known amount of titanium introduced into the reactor.

Isotactic Index

A sample is weighed and extracted with refluxing heptane for at least 4 hours. The insoluble polymer is thoroughly dried and weighed. The percentage of polymer insoluble under the extraction conditions is reported as the isotactic index (II).

The isotactic index of a polymer (II) may be used to estimate the xylene soluble content of the polymer. In the case of propylene homopolymer, xylene solubles is approximately equal to 63.2-(0.629 x II).

Xylene Solubles

A sample is weighed and completely dissolved in xylene in a flask by heating under reflux at 120° C. with stirring. The flask is then immersed in a water bath at 25° C. for one hour, during which time the insoluble polymer precipitates. The precipitate is filtered off, and the amount of soluble polymer present in the filtrate is determined by evaporating a 100 ml aliquot of the filtrate, drying the residue under vacuum, and weighing the residue. The xylene-soluble content consists of amorphous material with some low molecular weight crystalline material.

The xylene-soluble content of a polymer (XS) may be used to estimate the isotactic index of the polymer. In the case of propylene homopolymer, isotactic index is approximately equal to (63.2 XS)/0.629.

Molecular Weight Distribution, $M_w/M_n$

Determined by Size Exclusion Chromotography.

Method A: Cross-linked polystyrene column pore size sequence: less than 1000 Å, mixed 500 to $10^6$ Å, mixed 500 to $10^6$ Å, $10^7$ Å. 1,2,4-trichlorobenzene solvent at 140° C. with refractive index detection.

Method B: Two cross linked polystyrene columns with mixed beds of 100 to $10^7$ Å pore size. 1,2,4-trichlorobenzene solvent at 145° C. with refractive index detection.

EXAMPLES 1-3

Preparation of Solid Catalyst Component

To a solution of 70 ml of titanium tetrachloride (120 grams, 0.64 mols) in 3.7 l of chlorobenzene were added, in succession, 180 ml of diisobutyl phthalate (187 grams, 0.67 mol), 590 grams (5.2 mol) of magnesium diethoxide, and a solution of 4.7 l of titanium tetrachloride (8100 grams, 43 mols) in 1.2 l of chlorobenzene. A temperature of 20° C. to 25° C. was maintained during these additions. The resulting mixture was then heated to 110° C. with stirring where the temperature was maintained for 1 hour. At the end of this time, the mixture was filtered while hot. A solid material was collected.

The solid material collected was then slurried in a solution of 4.7 l of titanium tetrachloride (8100 grams, 43 mols) in 1.2 l of chlorobenzene at room temperature. A solution of 45 grams (0.22 mol) of phthaloyl chloride in 3.7 l of chlorobenzene was added to the slurry at room temperature, and the resulting slurry was then heated to 110° C. with stirring where the temperature was maintained for 30 minutes. At the end of this time, the mixture was filtered while hot. A solid material was collected.

The solid material collected was reslurried in a solution of 4.7 l of titanium tetrachloride (8100 grams, 43 mols) in 1.2 l of chlorobenzene at room temperature. An additional 3.7 l of chlorobenzene was then added to the slurry at room temperature, and the resulting slurry was heated to 110° C. with stirring where the temperature was maintained for 30 minutes. At the end of this time, the mixture was filtered while hot. A solid material was collected.

The solid material was reslurried once again in a solution of 4.7 l of titanium tetrachloride (8100 grams, 43 mols) in 1.2 l of chlorobenzene at room temperature. An additional 3.2 l of chlorobenzene was then added to the slurry at room temperature, and the resulting slurry was heated to 110° C. with stirring where the temperature was maintained for 30 minutes. At the end of this time, the mixture was filtered while hot. The residue was washed 6 times with 500 ml portions of hexane at 25° C., and then dried under a nitrogen purge. The product weighed about 500 grams.

Polymerization

The solid catalyst component prepared in this manner was employed together with triethylaluminum, as cocatalyst, and diphenyldimethoxysilane, as selectivity control agent or outside electron donor, to polymerize propylene, under varying reaction conditions, in a fluid bed reactor system similiar to that described and illustrated in U.S. Pat. Nos. 4,302,565, 4,302,566 and 4,303,771.

In each polymerization, the solid catalyst component prepared in the above manner was continually fed to the polymerization reactor as a 30 percent dispersion in mineral oil. The triethylaluminum cocatalyst was employed as a 2.5 percent solution in isopentane, and the diphenyldimethoxysilane selectivity control agent was employed as a 1 percent solution in isopentane.

Hydrogen was added to the reactor as a chain transfer agent to regulate the molecular weight of the polymer produced. A small amount of nitrogen was also present.

Table I below sets forth the details of these polymerizations, as well as the properties of the polymers produced by such polymerizations and the productivity of each catalyst system.

COMPARATIVE EXAMPLES A-D

For comparative purposes, propylene was polymerized as in Examples 1-3 except that polymerization temperatures of 60° C., 65° C. and 80° C. were employed. The details of these polymerizations are set forth in Table I below along with the details of Examples 1-3.

TABLE I

| Example | 1 | 2 | 3 | Comp. Exp. A | Comp. Exp. B | Comp. Exp. C | Comp. Exp. D |
|---|---|---|---|---|---|---|---|
| Reaction Conditions | | | | | | | |
| Al/Ti Ratio | 30 | 27 | 54 | 39 | 35 | 28 | 87 |
| Al/Selectivity Control Agent Ratio | 3.5 | 4.2 | 5.1 | 1.5 | 11 | 4.0 | 42 |
| Temperature, °C. | 100 | 110 | 110 | 60 | 65 | 80 | 80 |
| Residence Time, hours | 5.5 | 1.9 | 4.6 | 3.2 | 2.2 | 1.5 | 3.1 |
| Total Pressure, kPa | 3000 | 3000 | 3000 | 3000 | 3000 | 2900 | 3000 |
| Propylene Partial Pressure, kPa | 2500 | 2600 | 2700 | 2300 | 2400 | 2400 | 2500 |
| Hydrogen/Propylene Mol Ratio | .0014 | .017 | .00083 | .0045 | .0040 | .0028 | .0026 |
| Polymer Properties | | | | | | | |
| Melt Flow Rate, g/10 Min. | 4.30 | 82.9 | 4.60 | 6.96 | 5.90 | 4.60 | 6.80 |
| *Isotactic Index, % | 97.2 | 97.3 | 97.6 | 95.4 | 92.8 | 97.1 | 93.2 |
| Xylene Solubles, % | 2.03 | 2.00 | 1.80 | 3.15 | 4.80 | 2.10 | 4.60 |
| $M_w/M_n$, Method A | 4.43 | 3.76 | — | 6.96 | 5.69 | 5.15 | 5.01 |
| $M_w/M_n$, Method B | — | — | 3.50 | — | — | — | — |
| $M_w \times 10^{-3}$ | 291 | 109 | 176 | 367 | 246 | 257 | 237 |
| Productivity | | | | | | | |
| kg Polymer/g Ti | 630 | 480 | 690 | 340 | 530 | 1200 | 1300 |

*Calculated from xylene-soluble measurements

EXAMPLES 4-6

Preparation of Solid Catalyst Component

To a solution of 75 ml. of titanium tetrachloride (130 grams, 0.68 mols) in 75 ml of chlorobenzene were added, in succession, 5.72 g (50 mmol) of magnesium diethoxide and, in a dropwise manner, 3.0 ml of diisobutyl phthalate (3.1 grams, 11.0 mmol). A temperature of 20° C. to 25° C. was maintained during these additions. The resulting mixture was then heated to 110° C. with stirring where the temperature was maintained for 1 hour. At the end of this time, the mixture was filtered while hot. A solid material was collected.

The solid material collected was then slurried in a solution of 75 ml of titanium tetrachloride (130 grams, 0.68 mols) in 75 ml of chlorobenzene at room temperature. The resulting slurry was heated to 110° C. with stirring where the temperature was maintained for 30 minutes. At the end of this time, the mixture was filtered while hot. A solid material was collected.

The solid material collected was reslurried in a solution of 75 ml of titanium tetrachloride (130 grams, 0.68 mols) in 75 ml of chlorobenzene at room temperature. The resulting slurry was then heated to 110° C. with stirring where the temperature was maintained for 30 minutes. At the end of this time, the mixture was filtered while hot. A solid material was collected.

The solid material collected was reslurried once again in a solution of 75 ml of titanium tetrachloride (130 grams, 0.68 mols) in 75 ml of chlorobenzene at room temperature. The resulting slurry was then heated to 110° C. with stirring where the temperature was maintained for 30 minutes. At the end of this time, the mixture was filtered while hot. The residue was washed 6 times with 150 ml portions of isopentane at 25° C., and then dried under vacuum. The product weighed 5.6 grams.

Polymerization

The solid catalyst component prepared in this manner was employed together with triethylaluminum, as cocatalyst, and diphenyldimethoxysilane, as selectivity control agent or outside electron donor, to polymerize propylene, under varying gas phase polymerization conditions, in a one-liter salt bed reactor system.

In each polymerization, the triethylaluminum cocatalyst and the diphenyldimethoxysilane selectivity control agent were pre-mixed and added together to a stirred reactor bed consisting of 200 grams of sodium chloride. The solid catalyst component was added as a 5 percent dispersion in mineral oil. The temperature of the bed was maintained at 55° C. during the additions.

After the addition of the catalyst components was completed, the reactor was pressurized to 210 kPa with a mixture of 10 percent hydrogen and 90 percent nitrogen, and then vented to atmospheric pressure. The procedure was repeated two more times. After the third venting, the reactor was pressurized to the desired polymerization pressure with propylene and simultaneously heated to the desired polymerization temperature. Polymerization was allowed to continue for 2 hours, during which time propylene was continually added to the reactor to maintain the pressure constant. A constant temperature was also maintained during this period.

At the end of 2 hours, the reactor was vented and opened. The salt bed and polymer product mixture was then agitated in a blender with 600 ml of methanol, 400 ml of isopropanol and 0.1 g of an antioxidant. The mixture was then filtered and the solid polymer product collected was washed twice with 1 l portions of water, and then dried overnight at 70° C. under vacuum.

Table II below sets forth the details of these polymerizations, as well as the properties of the polymers produced by such polymerizations and the productivity of each catalyst system.

COMPARATIVE EXAMPLES E-G

For comparative purposes, propylene was polymerized as in Examples 4-6 except that polymerization temperatures of 55° C., 67° C. and 80° C. were employed. The details of these polymerizations are set forth in Table II below along with the details of Examples 4-6.

The catalyst employed was prepared in essentially the same manner as in Examples 4-6 except that after the magnesium diethoxide had been halogenated with titanium tetrachloride and reslurred in titanium tetrachloride and chlorobenzene for the first time, 0.25 ml of phthaloyl dichloride (1.7 mmol) was added to the slurry in a dropwise manner at room temperature before it was heated to 110° C.

COMPARATIVE EXAMPLES H-K

Preparation of Solid Catalyst Component

A solid catalyst component was prepared as described in U.S. Pat. No. 4,414,132.

To a solution of 75 ml of titanium tetrachloride (130 grams, 0.68 mols) in 75 ml of chlorobenzene were added, in succession, 5.72 g (50 mmol) of magnesium diethoxide and, in a dropwise manner, 2.4 ml of ethyl benzoate (2.5 grams, 17 mmol). A temperature of 20° C. to 25° C. was maintained during these additions. The resulting mixture was then heated to 110° C. with stirring where the temperature was maintained for 1 hour. At the end of this time, the mixture was filtered while hot. A solid material was collected.

The solid material collected was then slurried in a solution of 75 ml of titanium tetrachloride (130 grams, 0.68 mols) in 75 ml of chlorobenzene at room temperature. To the slurry was added, at room temperature and in a dropwise manner, 0.40 ml of benzoyl chloride (3.4 mmol). The resulting slurry was then heated to 110° C. with stirring where the temperature was maintained for 30 minutes. At the end of this time, the mixture was filtered while hot. A solid material was collected.

The solid material collected was reslurried in a solution of 75 ml of titanium tetrachloride (130 grams, 0.68 mols) in 75 ml of chlorobenzene at room temperature. The resulting slurry was then heated to 110° C. with stirring where the temperature was maintained for 30 minutes. At the end of this time, the mixture was filtered while hot. The residue was washed 6 times with 150 ml portions of isopentane at 25° C., and then dried at 40° C. under a nitrogen atmosphere. The product weighed 5.9 grams.

Polymerization

For comparative purposes, propylene was polymerized as in Examples 4-6 using the solid catalyst component prepared as above in accordance with U.S. Pat. No. 4,414,132 together with triethylaluminum as cocatalyst and p-ethoxy ethylbenzoate as selectivity control agent. The details of these polymerizations are set forth in Table II below along with the details of Examples 4-6.

TABLE II

| Example | 4 | 5 | 6 | Comp. Exp. E | Comp. Exp. F | Comp. Exp. G | Comp. Exp. H | Comp. Exp. I | Comp. Exp. J | Comp. Exp. K |
|---|---|---|---|---|---|---|---|---|---|---|
| Reaction Conditions | | | | | | | | | | |
| Solid Cat. Comp., grams | .0157 | .0157 | .0157 | .0198 | 0.198 | 0.198 | 0.175 | 0.175 | 0.145 | 0.116 |
| Al/Ti Ratio | 70 | 70 | 70 | 70 | 70 | 70 | 70 | 70 | 70 | 70 |
| Al/Selectivity Control Agent Ratio | 2.0 | 2.0 | 2.0 | 4.0 | 4.0 | 8.0 | 3.4 | 3.4 | 2.6 | 2.0 |
| Temperature, °C. | 100 | 115 | 140 | 55 | 67 | 80 | 67 | 100 | 100 | 100 |
| Polymerization Time, hours | 2.0 | 2.0 | 2.0 | 2.0 | 2.0 | 2.0 | 2.0 | 1.0 | 2.0 | 2.0 |
| Total Pressure, kPa | 1900 | 1900 | 1900 | 1600 | 1900 | 1900 | 1900 | 1900 | 1900 | 1900 |
| Hydrogen/Propylene Mol Ratio | .005 | .005 | .005 | .004 | .005 | .005 | 0 | .005 | .001 | .001 |
| Polymer Properties | | | | | | | | | | |
| Isotactic Index, % | 98.0 | 97.9 | 98.5 | 95.8 | 98.1 | 94.8 | 95.2 | 85.3 | 87.6 | 94.6 |
| *Xylene Solubles, % | 1.51 | 1.61 | 1.23 | 2.94 | 1.50 | 3.57 | 3.32 | 9.55 | 8.10 | 3.70 |
| $M_w/M_n$, Method A | — | 4.46 | — | 5.95 | 5.81 | 5.20 | 5.22 | 5.41 | 6.52 | 5.59 |
| $M_w/M_n$, Method B | 3.87 | — | 3.56 | — | — | — | — | — | — | — |
| $M_w \times 10^{-3}$ | 178 | 208 | 128 | 277 | 332 | 253 | 508 | 257 | 331 | 413 |
| Productivity | | | | | | | | | | |
| kg Polymer/g Ti | 310 | 365 | 153 | 261 | 448 | 416 | 215 | 53 | 14 | 3.5 |

*Calculated from Isotactic Index measurements

We claim:

1. A process for producing propylene polymers having a molecular weight distribution of from 3.0 to 4.5 and an isotatic index of from 97 percent to 99 percent which comprises contacting propylene in a fluid bed reactor, at a pressure no greater than 7000 kPa and a temperature of at least 100° C., with a catalytically effective amount of a catalyst system comprising (a) a solid catalyst component containing magnesium, titanium, halide and a polycarboxylic acid ester containing two coplanar ester groups attached to adjacent carbon atoms, said catalyst component being obtained by halogenating a magnesium compound of the formula MgR'R", wherein R' and R" are alkoxide groups containing from 1 to 8 carbon atoms, with titanium tetrachloride, in the presence of (1) an aromatic halohydrocarbon containing from 6 to 12 carbon atoms and from 1 to 2 halogen atoms and (2) a polycarboxylic acid ester derived from (i) a branched or unbranched monohydric alcohol containing from 1 to 12 carbon atoms and (ii) a monocyclic or polycyclic aromatic compound containing from 8 to 20 carbon atoms and two carboxyl groups which are attached to ortho carbon atoms of the ring structure, (b) an organoaluminum cocatalyst, and (c) an electron donor containing a silicon-oxygen-carbon linkage and having the formula $$R''''''_m SiY_n X_p$$

wherein

R''''' is a hydrocarbon radical containing from 1 to 20 carbon atoms,

Y is —OR''''' or —COR''''' wherein R''''' is a hydrocarbon radical containing from 1 to 20 carbon atoms, X is hydrogen or halogen, m is an integer having a value of from 0 to 3, n is an integer having a value of from 1 to 4, p is an integer having a value of from 0 to 1, and m+n+p is equal to 4, said catalyst containing an atomic ratio of aluminum in the organoaluminum cocatalyst to silicon in the electron donor of from 0.5:1 to 100:1, and an atomic ratio of aluminum in the organoaluminum cocatalyst to titanium in the solid catalyst component of from 5:1 to 300:1.

2. A process as in claim 1 wherein the magnesium compound is magnesium diethoxide.

3. A process as in claim 2 wherein the halohydrocarbon is chlorobenzene.

4. A process as in claim 3 wherein the polycarboxylic acid ester is diisobutyl phthalate.

5. A process as in claim 4 wherein the halogenated product is treated twice with additional titanium tetrachloride and the second treatment is effected in the presence of a polycarboxylic acid halide containing two coplanar acid halide groups attached to adjacent carbon atoms.

6. A process as in claim 5 wherein the polycarboxylic acid halide is phthaloyl dichloride, 7. A process as in claim 4 wherein propylene is copolymerized with up to 20 mole percent ethylene in a second polymerization reactor in the presence of the product of the first polymerization reactor.

8. A process as in claim 4 wherein the electron donor containing a silicon-oxygen-carbon linkage is diphenyldimethoxysilane.

9. A process as in claim 6 wherein the electron donor containing a silicon-oxygen-carbon linkage is diphenyldimethoxysilane.

* * * * *